(12) United States Patent
Okumura et al.

(10) Patent No.: US 11,110,628 B2
(45) Date of Patent: Sep. 7, 2021

(54) METHOD FOR PRODUCING HONEYCOMB STRUCTURE

(71) Applicant: NGK INSULATORS, LTD., Nagoya (JP)

(72) Inventors: Kensuke Okumura, Nagoya (JP); Hirotada Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 47 days.

(21) Appl. No.: 16/747,828

(22) Filed: Jan. 21, 2020

(65) Prior Publication Data

US 2020/0238569 A1 Jul. 30, 2020

(30) Foreign Application Priority Data

Jan. 24, 2019 (JP) .............................. JP2019-010606

(51) Int. Cl.
*B28B 11/24* (2006.01)
*F26B 3/347* (2006.01)
*F26B 25/18* (2006.01)
*C04B 33/30* (2006.01)
*F26B 15/14* (2006.01)
*C04B 38/00* (2006.01)

(52) U.S. Cl.
CPC .......... *B28B 11/243* (2013.01); *B28B 11/241* (2013.01); *B28B 11/248* (2013.01); *F26B 3/347* (2013.01); *F26B 25/185* (2013.01); *C04B 33/30* (2013.01); *C04B 38/0006* (2013.01); *C04B 2235/606* (2013.01); *F26B 15/14* (2013.01); *F26B 2210/02* (2013.01)

(58) Field of Classification Search
None
See application file for complete search history.

(56) References Cited

U.S. PATENT DOCUMENTS 5,265,346 A 11/1993 Jikumaru et al.

FOREIGN PATENT DOCUMENTS

JP 2647752 B2 8/1997

*Primary Examiner* — Jason Lau
(74) *Attorney, Agent, or Firm* — Burr & Brown, PLLC

(57) ABSTRACT

A method for producing a honeycomb structure including producing an unfired pillar shaped honeycomb body; placing the unfired pillar shaped honeycomb body on a receiving table such that the unfired pillar shaped honeycomb body stands thereon; conveying the unfired pillar shaped honeycomb body placed on the receiving table; drying the unfired pillar shaped honeycomb body after the conveying step, or drying the unfired pillar shaped honeycomb body during the conveying to obtain a honeycomb dried body; and firing the honeycomb dried body to obtain a honeycomb structure. The receiving table includes at least one protrusion. In the honeycomb formed body conveying step, the unfired pillar shaped honeycomb body is conveyed while supporting it by inserting the at least one protrusion of the receiving table into a bottom surface of the unfired pillar shaped honeycomb body placed on the receiving table.

11 Claims, 7 Drawing Sheets

FIG. 1(a) Vibrated back and forth
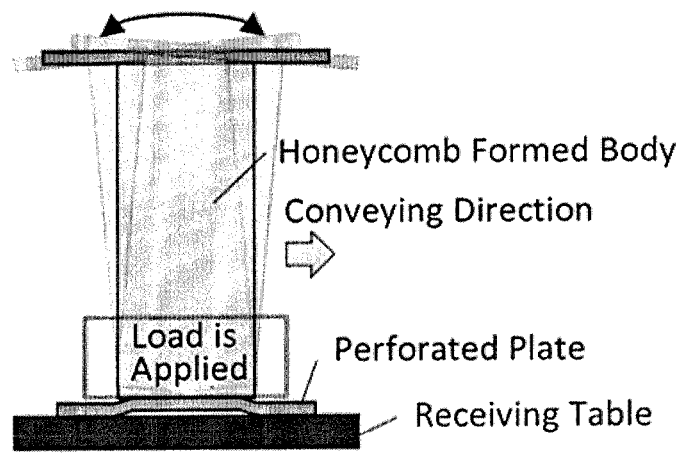
FIG. 1(b)
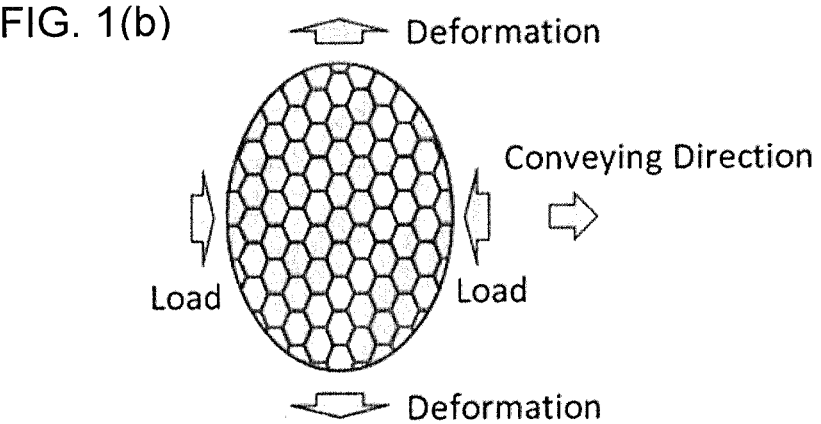

Schematic External View

Cross-Sectional View

METHOD FOR PRODUCING HONEYCOMB STRUCTURE

FIELD OF THE INVENTION

The present invention relates to a method for producing a honeycomb structure. More particularly, the present invention relates to a method for producing a pillar shaped honeycomb structure in which deformation of a shape of a cross-sectional shape perpendicular to a length direction is satisfactorily suppressed.

BACKGROUND OF THE INVENTION

Honeycomb structures are generally produced through steps of preparing a honeycomb formed body, placing the honeycomb formed body on a receiving table and conveying it, drying the conveyed honeycomb formed body to produce a honeycomb dried body, and firing the honeycomb dried body.

As an example of a method for forming a honeycomb formed body, an extrusion molding method is known in the art. In the extrusion molding method, a mold having a desired shape is attached to an extrusion outlet of an extruder in which an extrusion direction is set to a horizontal direction, and a ceramic material added to the extruder is continuously extruded from the mold to form a pillar shaped honeycomb formed body. The pillar shaped honeycomb formed body is cut in a direction perpendicular to an axial direction so as to have a desired length as needed, and each of the cut honeycomb formed bodies is then placed on a receiving table so as to stand thereon. The pillar shaped honeycomb formed bodies placed on the receiving table so as to stand are conveyed on a belt conveyor or the like, and dried by dielectric drying, ventilation drying or the like, during or after the conveying.

Here, the honeycomb formed body immediately after extrusion molding is clayish and is thus very flexible and easily deformed. In order to obtain a final formed body having high quality, it is necessary to support the pillar shaped honeycomb formed body immediately after extrusion molding so as not to be deformed, and to conveying it to each step. As a technique for suppressing deformation of the pillar shaped honeycomb formed body in the conveying step, Patent Document 1 discloses that the honeycomb formed body is conveyed by providing a convex-shaped perforated plate on a receiving table, and conveying the pillar shaped honeycomb formed body while placing it on the perforated plate so as to stand thereon. Further, the upper surface of the convex portion of the perforated plate is flat and has an area smaller than the area of the lower end surface of the honeycomb formed body. Patent Document 1 discloses that according to such a configuration, the area of the lower end surface of the honeycomb formed body, which is in contact with the perforated plate, is reduced, resulting in decreased frictional resistance with the perforated plate when the honeycomb formed body shrinks during drying, whereby dimensional deformation and cracks generated during drying can be appropriately prevented.

CITATION LIST

Patent Literature

Patent Document 1: Japanese Patent No. 2647752 B

SUMMARY OF THE INVENTION

Technical Problem

In order to produce efficiently a honeycomb structure product, two or three honeycomb formed bodies may be cut out from one pillar shaped honeycomb formed body extruded from an extruder. In this case, the cut-out pillar shaped honeycomb formed body has increased length in the vertical direction. Here, in the step of conveying the cut-out pillar shaped honeycomb formed bodies, front-back swing may be generated in the conveying direction, such as at the start of conveying, at the stopping of conveying in the middle of conveying, and at the restarting of conveying. In this case, an increased length of the pillar shaped honeycomb formed body in the longitudinal direction as described above results in increased front-back swing in the conveying direction.

In order to explain the swing during conveyance, as an example, FIG. 1 shows a configuration of a conveying means for the honeycomb formed body as described in Patent Document 1. FIG. 1(a) is a schematic external view when a state of an unfired pillar shaped honeycomb formed body being conveyed while being placed so as to stand on a receiving table on which a perforated plate is placed is viewed from a lateral side in the conveying direction. FIG. 1(b) is a cross-sectional view perpendicular to a length direction at a lower portion of the unfired pillar shaped honeycomb formed body in FIG. 1(a). The pillar shaped honeycomb formed body cut out from the honeycomb formed body extruded from the extruder is clayish, which is very flexible and easily deformed. Therefore, with swinging during conveying, a load is applied, particularly to the lower portion when placed on the receiving table, from the front and back in the conveying direction to the inner direction. As shown in FIG. 1(b), the lower portion of the pillar shaped honeycomb formed body loaded from the front and back in the conveying direction becomes thinner in the front and back direction in the conveying direction and thicker in the lateral direction in the conveying direction. As a result, a difference in the cross-sectional shape is generated between the upper portion and the lower portion of the pillar shaped honeycomb formed body, which causes a problem that a honeycomb structure having a uniform cross-sectional shape in the up and down direction cannot be produced.

An object of the present invention is to provide a method for producing a honeycomb structure in which deformation of a shape of a cross section perpendicular to a length direction is satisfactorily suppressed.

Solution to Problem

As a result of intensive studies, the present inventors have found that the above problem can be solved by providing a protrusion(s) on a receiving table that is disposed when conveying an unfired pillar shaped honeycomb formed body, and conveying the unfired pillar shaped honeycomb formed body while supporting the unfired pillar shaped pillar shaped honeycomb formed body by inserting the protrusion(s) into an bottom face of the unfired pillar shaped honeycomb formed body placed on the receiving table so as to stand thereon. Thus, the present invention is specified as follows:

A method for producing at least one honeycomb structure, the method comprising:

a honeycomb formed body producing step of producing at least one unfired pillar shaped honeycomb body;

a honeycomb formed body placing step of placing the at least one unfired pillar shaped honeycomb formed body on a receiving table such that that the at least one unfired pillar shaped honeycomb formed body stands thereon;

a honeycomb formed body conveying step of conveying the at least one unfired pillar shaped honeycomb formed body placed on the receiving table;

a honeycomb dried body producing step of drying the at least one unfired pillar shaped honeycomb formed body conveyed in the honeycomb formed body conveying step, or drying the at least one unfired pillar shaped honeycomb formed body while conveying it in the honeycomb formed body conveying step to obtain at least one honeycomb dried body; and a firing step of firing the at least one honeycomb dried body to obtain at least one honeycomb structure, wherein the receiving table comprises at least one protrusion; and wherein, in the honeycomb formed body conveying step, the at least one unfired pillar shaped honeycomb formed body is conveyed while supporting it by inserting the at least one protrusion of the receiving table into a bottom surface of the at least one unfired pillar shaped honeycomb formed body placed on the receiving table.

Advantageous Effects of Invention

According to this invention, it is possible to provide a method for producing a honeycomb structure in which deformation of a shape of a cross section perpendicular to a length direction is satisfactorily suppressed.

BRIEF DESCRIPTION OF THE DRAWINGS

FIG. 1(a) is a schematic external view in a conveying means as described in Patent Document 1, when a state of an unfired pillar shaped honeycomb formed body being conveyed while being placed so as to stand on a receiving table on which a perforated plate is mounted is viewed from a lateral side in a conveying direction. FIG. 1(b) is a cross-sectional view perpendicular to a length direction at a lower portion of the unfired pillar shaped honeycomb formed body in FIG. 1(a).

DETAILED DESCRIPTION OF THE INVENTION

Hereinafter, embodiments of a method for producing a honeycomb structure according to the present invention will be described with reference to the drawings. However, various changes, modifications and improvements may be made based on the knowledge of a person skilled in the art, without deviating from the spirit of the present invention.

A method for producing at least one honeycomb structure includes: a honeycomb body producing step of producing at least one unfired pillar shaped honeycomb body; a honeycomb formed body placing step of placing the at least one unfired pillar shaped honeycomb formed body on a receiving table such that the at least one unfired pillar shaped honeycomb formed body stands thereon; a honeycomb formed body conveying step of conveying the at least one unfired pillar shaped honeycomb formed body placed on the receiving table; a honeycomb dried body producing step of drying the at least one unfired pillar shaped honeycomb formed body conveyed in the honeycomb formed body conveying step, or drying the at least one unfired pillar shaped honeycomb formed body while conveying it in the honeycomb formed body conveying step to obtain at least one honeycomb dried body; and a firing step of firing the at least one honeycomb dried body to obtain at least one honeycomb structure.

Figure 2:
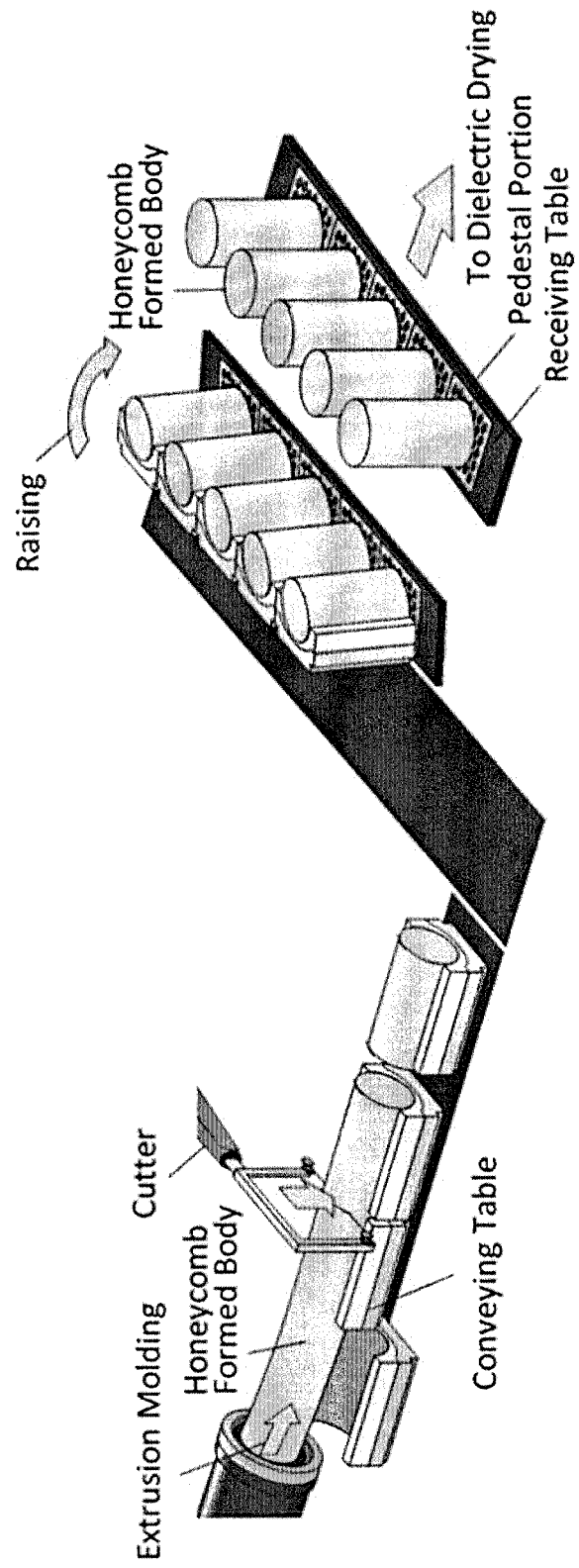
FIG. 2 is a view schematically showing a honeycomb formed body producing step of producing unfired pillar shaped honeycomb formed bodies; a honeycomb formed body placing step of placing the unfired pillar shaped honeycomb formed bodies on a receiving table such that they stands thereon; and a honeycomb formed body conveying step of conveying the unfired pillar shaped honeycomb formed bodies placed on the receiving table, in a method for producing honeycomb structures according to an embodiment of the present invention.

FIG. 2 schematically shows a honeycomb formed body producing step of producing unfired pillar shaped honeycomb formed bodies; a honeycomb formed body placing step of placing the unfired pillar shaped honeycomb formed bodies on a receiving table such that they stands thereon; and a honeycomb formed body conveying step of conveying the unfired pillar shaped honeycomb formed bodies placed on the receiving table, in the method for producing the honeycomb structures according to an embodiment of the present invention.

In the embodiment of the present invention, as an example of the pillar shaped honeycomb structure, a circular pillar shaped honeycomb structure having porous partition walls that define a plurality of cells extending in a length direction is produced. The honeycomb structure may be formed of at least one ceramic material selected from the group consisting of cordierite, silicon carbide, aluminum titanate, silicon nitride, mullite, and alumina.

In the honeycomb formed body producing step, first, a green body containing a ceramic raw material is formed into a honeycomb shape having the partition walls. For example, when producing a honeycomb structure made of cordierite as a ceramic raw material, first, a cordierite forming raw material is prepared as a material for the green body. The cordierite forming raw material is prepared by blending a silica source component, a magnesia source component, an alumina source component, and the like, in order to blend each component so as to have a theoretical composition of a cordierite crystal.

Then, materials for the green body (additives) to be added to the cordierite forming raw material are prepared. As the additives, at least a binder is used. In addition to the binder, a pore former, a dispersant, a surfactant and the like can be used. Then, to 100 parts by mass of the cordierite forming raw material were added, for example, from 3 to 8 parts by mass of the binder, from 3 to 40 parts by mass of the pore former, from 0.1 to 2 parts by mass of the dispersant, and from 10 to 40 parts of water, and mixed together. These materials for the green body are kneaded to prepare a green body.

The prepared green body is then formed into a honeycomb shape by extrusion molding to obtain a green (unfired) honeycomb formed body. The extrusion molding can be carried out using an apparatus such as a ram type extruder or a twin screw type continuous extruder. The forming of the honeycomb shape is suitably carried out using a die having a desired cell shape, partition wall thickness, and cell density.

A clayish pillar shaped honeycomb formed body extruded from such an extruder is placed on a conveying table in a state where its central axis is horizontal. In the present embodiment, the honeycomb formed body is formed in a circular pillar shape, and the conveying table has a concave-shaped mounting surface for the honeycomb formed body so that the circular pillar shaped honeycomb formed body can be easily mounted. The mounting surface of the honeycomb formed body on the conveying table is not limited to the concave shape, and it can be formed to correspond to the shape of the honeycomb formed body. An outer shape of the honeycomb formed body includes, but not particularly limited to, any shape such as end faces each having a circular pillar shape (cylindrical shape), end faces each having an oval pillar shape, and end faces each having a polygonal (square, pentagonal, hexagonal, heptagonal, octagonal, etc.) shape, as in the present embodiment.

A plurality of conveying tables are successively fed from a lower side so as to approach the pillar shaped honeycomb formed body extruded from the extruder, and they moves in the horizontal direction while supporting the extruded honeycomb formed body. The honeycomb formed body on the conveying table that has moved in the horizontal direction is cut into a predetermined length by means of a cutter and then conveyed through a conveying path. Here, a size of each honeycomb formed body to be cut and conveyed is not particularly limited, but a length in the central axis direction may be from 40 to 500 mm. Further, for example, when the honeycomb structure has a cylindrical outer shape, each end face may have a radius of from 30 to 200 mm.

The conveyed pillar shaped honeycomb formed bodies are aligned in a row (in FIG. 2, five pillar shaped honeycomb formed bodies were aligned in a row), and all the conveying tables are then raised at once, whereby they are placed on a prepared receiving table so as to stand thereon. Although the shape of the receiving table is not particularly limited, the receiving table is preferably formed, for example in a flat plate shape, because it is intended to convey the honeycomb formed body on a belt conveyor. The receiving table can be formed from any material, including, but not particularly limited to, metal materials such as aluminum, copper, iron, and stainless steel, or resin materials such as foamed polyurethane resins and foamed polystyrene resins, which can allow weight reduction.

The receiving table includes at least one protrusion. While the present embodiment discloses a structure where the receiving table includes a pedestal portion as described later and the protrusion portion is provided on the pedestal portion, the protrusion portion may be directly provided without providing the pedestal portion on the receiving table. By thus providing the protrusion on the receiving table, the unfired pillar shaped honeycomb formed body can be conveyed while supporting it by inserting the protrusion of the receiving table into a bottom surface of the unfired pillar shaped honeycomb formed body placed on the receiving table, in the honeycomb formed body conveying step. Thus, the pillar shaped honeycomb formed body can be fixed to be stabilized on the receiving table, so that the swinging at the time of conveyance can be suppressed, thereby suppressing generation of a difference in cross-sectional shape between the upper portion and the lower portion of the pillar shaped honeycomb formed body. As a result, it is possible to produce a honeycomb structure in which deformation of the shape of the cross section perpendicular to the length direction is satisfactorily suppressed. Since the unfired pillar shaped honeycomb formed body is clayish and very flexible, the protrusion is inserted into the bottom face of the pillar shaped honeycomb formed body, only by raising the conveying table having the pillar shaped honeycomb formed body mounted thereon to place it on the receiving table, whereby the pillar shaped honeycomb structure can be supported by that protrusion.

In the embodiment of the present invention, the unfired pillar shaped honeycomb formed body is conveyed while "supporting it by inserting" the protrusion of the receiving table into the bottom face of the unfired columnar honeycomb formed body placed on the receiving table. The expression "supporting it by inserting" means that the entire protrusion may be in a state of being inserted so as to be embedded from the bottom face of the pillar shaped honeycomb formed body to the interior. Alternatively, it means that the bottom face of the pillar shaped honeycomb formed body may become depressed so as to be crushed by the protrusion, thereby becoming supported by the protrusion.

The shape of the protrusion is not particularly limited, but it is preferably in a sharp shape enough to be inserted into the bottom face of the pillar shaped honeycomb formed body simply by raising the conveying table with the pillar shaped honeycomb formed body mounted to place it on the receiving table so as to stand thereon. The shape of the protrusion may be, for example, a rod shape. Here, the rod shape may be a columnar shape or a prismatic shape, or it may be a conical shape or a pyramid shape as long as it is further elongated, or it may be a needle shape whose tip is only sharp. It may also be a protruding portion having a pedestal table on which a portion having the above rod shape is formed. Examples of a material of the protrusion that can be used includes, but not particularly limited to, metal materials such as aluminum, copper, iron, and stainless steel, or resin materials such as fluororesin.

A plurality of protrusions are preferably provided, because the plurality of protrusions can allow more stable support of the pillar shaped honeycomb formed body. Further, the protrusions are preferably provided at least in the front and backward in the conveying direction on the receiving table. Since the swinging at the time of conveying occurs in the front-back direction in the conveying direction, the provision of the protrusions least in the front and backward in the conveying direction on the receiving table can allow more effective and stable support of the pillar shaped honeycomb formed body. The number of protrusions is not particularly limited, but it is preferable that a plurality of protrusions are provided in a unit of two pairs of protrusions, such that the two pairs of protrusions are separated from the center of the bottom surface of the pillar shaped honeycomb formed body by the same distance as each other, and they are in positions that are symmetrical from the center of the bottom face. According to such an arrangement, the plurality of protrusions are always arranged evenly in the distance and direction from the center of the bottom face of the pillar shaped honeycomb formed body, thereby enabling the pillar shaped honeycomb formed body to be supported more stably.

Figure 3:
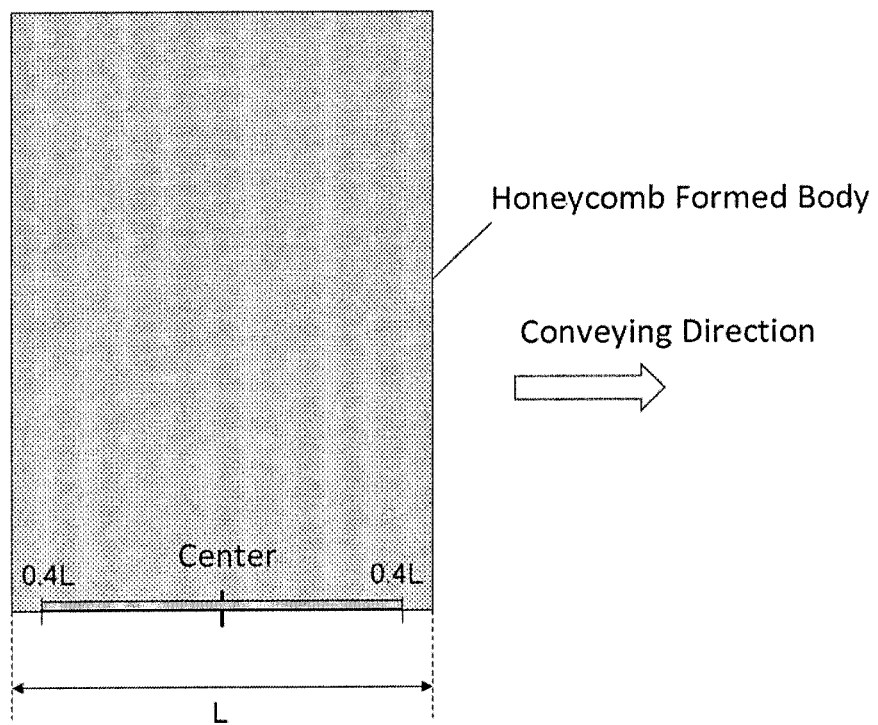
FIG. 3 is a view schematically showing a range from a center of a bottom surface as a base point to positions each separated by 0.4 L from the center, in which L is a length of the bottom surface of an unfired pillar shaped honeycomb formed body placed on a receiving table in a conveying direction.

The unfired pillar shaped honeycomb formed body is dried during conveying to release moisture contained therein, so that the unfired pillar shaped honeycomb formed body shrinks. At this time, when the protrusion is inserted to the outer end of the bottom face, any natural shrinkage of the honeycomb formed body may be prevented, so that the region may be deformed. Therefore, as shown in FIG. 3, the range where the protrusion is inserted on the bottom face of the unfired pillar shaped honeycomb formed body is preferably from the center of the bottom face as a base point to positions each separated by 0.4 L, in which L is a length of the bottom face in the conveying direction of the unfired pillar shaped honeycomb formed body placed on the receiving table. According to such a configuration, the protrusion is not inserted in a range from the center of the bottom face in the conveying direction of the honeycomb formed body to 0.5 L (outer end) beyond 0.4 L, so that the deformation of the honeycomb formed body can be suppressed without preventing the natural shrinkage of the honeycomb formed body due to drying during conveying. Further, the range where the protrusion is inserted on the bottom face of the unfired pillar shaped honeycomb formed body is more preferably from the center of the bottom face as a base point to positions each separated by 0.15 L or more. This is because, if it is inserted in a range of less than 0.15 L from the center, the effect of being fixed by the protrusion is weakened, so that the unfired pillar shaped honeycomb formed body may be easily shaken in the conveying direction.

The height of the protrusion is preferably from 0.5 to 5% of the height of the unfired pillar shaped honeycomb formed body when placed on the receiving table. If the height of the protrusion is less than 0.5% of the height of the unfired pillar shaped honeycomb formed body when placed on the receiving table, it may be difficult to stably support the unfired pillar shaped honeycomb formed body, and if it is more than 5%, the protrusion may unnecessarily crash the lower portion of the unfired pillar shaped honeycomb formed body and an area usable as a product is reduced, causing a problem in terms of cost. The height of the projection is more preferably from 1.5 to 3.0% of the height of the unfired pillar shaped honeycomb formed body when placed on the receiving table. When a plurality of protrusions are provided, the height of each protrusion can be changed.

A cross-sectional area of the protrusion is preferably from 0.04 to 1% of a bottom area of the unfired pillar shaped honeycomb formed body when placed on the receiving table. As used herein, the cross-sectional area of the protrusion refers to a maximum area of the cross section perpendicular to a protrusion extending direction. When a plurality of protrusions are provided, the cross-sectional area of each protrusion is preferably from 0.04 to 1% of the bottom area of the unfired pillar shaped honeycomb formed body when placed on the receiving table. If the cross-sectional area of the columnar protrusion is less than 0.04% of the bottom area of the unfired pillar shaped honeycomb formed body when placed on the receiving table, it may be difficult to stably support the unfired pillar shaped honeycomb formed body, and if it is more than 1%, the honeycomb formed body will have poor water release during drying in conveying or during the drying step after conveying, which may hinder the drying. The cross-sectional area of the columnar protrusion is more preferably from 0.1 to 0.25% of the bottom area of the unfired pillar shaped honeycomb formed body when placed on the receiving table. Further, the cross-sectional area of the columnar protrusion is preferably such that the number of crushed cells of the unfired pillar shaped honeycomb formed body is 10 cells or less, when the protrusion is inserted into the unfired pillar shaped honeycomb formed body when placed on the receiving table. If the cross-sectional area of the columnar protrusion is a cross section having a larger size enough to crush more than 10 cells of the honeycomb formed body when the protrusion is inserted into the unfired pillar shaped honeycomb formed body, it may deteriorate the water release from the honeycomb formed body during drying in conveying, or during the drying step after conveying, which may hinder the drying. The cross-sectional area of the columnar protrusions is such that the number of crushed cells of the unfired pillar shaped honeycomb formed body is more preferably from 3 to 8 cells, even more preferably from 3 to 5 cells, when the protrusion is inserted into the unfired pillar shaped honeycomb formed body when placed on the receiving table. It should be noted that the "crushed" for the cells of the unfired pillar shaped honeycomb formed body refers to a state where the initial cell shape is deformed in the cross section perpendicular to the extending direction of the pillar shaped honeycomb formed body.

The receiving table may include a pedestal portion on which the protrusion may be provided. According to such an arrangement, for example, the pedestal portion is formed of a punching plate having a plurality of through holes, so that moisture generated by drying the honeycomb formed body can be discharged via the through holes of the punching plate, thereby preventing water from being accumulated in the bottom surface of the honeycomb formed body. Each through hole of the punching plate may be circular, polygonal, slit shaped, or the like. An opening ratio of the through holes of the punching plate is preferably from 20 to 90%, and more preferably 40 to 80%. As described above, by forming the pedestal portion into the predetermined structure as needed, various functions in the conveying step can be added without changing the structure of the receiving table. For example, the pedestal portion is formed so as to also serve as an auxiliary electrode for dielectric drying, so that there is no need to provide a separate electrode when performing dielectric drying during or after conveying of the unfired pillar shaped honeycomb formed body, which will simplifying a structure of a dielectric drying apparatus.

The unfired pillar shaped honeycomb formed body is dried during conveying so that it shrinks due to release of moisture contained therein. At this time, if an area of a portion which is on an upper surface of the pedestal portion and is in contact with the bottom face of the unfired pillar shaped honeycomb formed body is the same as the bottom area of the unfired pillar shaped honeycomb formed body when placed on the receiving table, the natural shrinkage of the honeycomb formed body is hindered by frictional force with the upper surface of the pedestal portion. As a result, a lower region of the unfired pillar shaped honeycomb formed body may be deformed. For this reason, the area of the portion which is on the upper surface of the pedestal portion and is in contact with the bottom surface of the unfired pillar shaped honeycomb formed body is preferably from 40 to 70% of the bottom area of the unfired pillar shaped honeycomb formed body when placed on the receiving table. If the area of portion which is on the upper surface of the pedestal portion and is in contact with the bottom surface of the unfired pillar shaped honeycomb formed body is less than 40% of the bottom area of the unfired pillar shaped honeycomb formed body when placed on the receiving table, there is a risk that it is difficult to stably support the honeycomb formed body on the upper surface of the pedestal portion. Further, the area of the portion which is on the upper surface of the pedestal portion and is in contact with the bottom surface of the unfired pillar shaped honeycomb formed body is more than 70% of the bottom area of the unfired pillar shaped honeycomb formed body when placed on the receiving table, the natural shrinkage of the honeycomb formed body is hindered by the frictional force with the upper surface of the pedestal portion as described above, and the lower region of the honeycomb formed body may be deformed. The area of the portion which is on the upper surface of the pedestal portion and is in contact with the bottom surface of the unfired pillar shaped honeycomb formed body is more preferably from 50 to 60% of the bottom area of the unfired pillar shaped honeycomb formed body when placed on the receiving table.

The pedestal portion may have a convex portion at the center, and the convex portion may be the above portion which is on the upper surface of the pedestal portion and is in contact with the bottom surface of the unfired pillar shaped honeycomb formed body. That is, in this case, it is preferable that the area of the portion which is on the upper surface of the pedestal portion and is in contact with the bottom surface of the unfired pillar shaped honeycomb formed body will be the area of the upper surface of the convex portion, and the area of the upper surface of the convex portion is from 40 to 70% of the bottom area of the unfired pillar shaped honeycomb formed body when placed on the receiving table. The convex portion may be integrally formed with the pedestal portion by pressing against the pedestal portion, or may be separately formed on the pedestal portion with the same material or other material. Examples of the material of the pedestal portion that can be used include, but not particularly limited to, metal materials such as aluminum, copper, iron, stainless steel, or resin materials such as fluororesin.

The unfired pillar shaped honeycomb formed body is placed on the receiving table and conveyed as described above, and then dried by dielectric drying, or dried by dielectric drying while being conveyed, to provide a pillar shaped honeycomb dried body that has been adjusted to a predetermined size. The drying may employ hot air drying in addition to the dielectric drying. The pillar shaped honeycomb dried body is then fired to provide a pillar shaped honeycomb structure.

The honeycomb structure may be provided with a catalyst on the surface and/or interior of the porous partition walls forming the inner walls of the plurality of cells. The honeycomb structure may be configured as a catalyst support on which the catalyst is supported or as a filter (for example, a diesel particulate filter (DPF)) provided with plugged portions for purifying particulate matters (carbon fine particles) in an exhaust gas.

The type of the catalyst is not particularly limited and can be appropriately selected depending on purposes and applications of the honeycomb structure. Examples of the catalyst include noble metal catalysts or other catalysts. Illustrative examples of the noble metal catalysts include three way catalysts and oxidation catalysts which contain a noble metal such as platinum (Pt), palladium (Pd) and rhodium (Rh) supported on an alumina pore surface and contain a co-catalyst such as ceria and zirconia; or NOx storage reduction catalysts (LNT catalysts) containing an alkaline earth metal and platinum as nitrogen oxide (NOx) storage components. Examples of catalysts that do not use noble metals include NOx selective reduction catalysts (SCR catalysts) containing copper-substituted or iron-substituted zeolite, and the like. Further, two or more catalysts selected from the group consisting of those catalysts may be used. In addition, a method for supporting the catalyst is not particularly limited, and can be carried out according to a convention method for supporting a catalyst on a honeycomb structure.

EXAMPLES

Examples are provided below for better understanding of the present invention and its advantages, but the present invention is not limited to these Examples.

Examples 1 to 12

First, a cordierite forming raw material as a material for a green body, a binder and a pore former as additives, and a dispersant were mixed together and kneaded to prepare a green body. The prepared green body was then formed into a honeycomb shape in an extruder and extruded to obtain a green (unfired) circular pillar shaped honeycomb formed body. The circular pillar shaped honeycomb formed body had porous partition walls that define a plurality of cells extending in the length direction.

The unfired circular pillar shaped honeycomb formed body extruded from the extruder was in a state where the central axis is horizontal. To the honeycomb formed body, a plurality of conveying tables were fed such that they sequentially approached from the lower side, and the extruded honeycomb formed body allowed to move in the horizontal direction while supporting it. The unfired circular pillar shaped honeycomb formed body on the conveying table allowed to move in the horizontal direction was cut into a predetermined length by a cutter and then conveyed through the conveying path.

Subsequently, the conveyed circular pillar shaped honeycomb formed bodies were aligned in a horizontal row, and all of the conveying tables were raised at once, so that the honeycomb formed bodies were placed on a prepared flat plate-shaped receiving table so as to stand thereon, and then conveyed on a belt conveyor.

Figure 4:
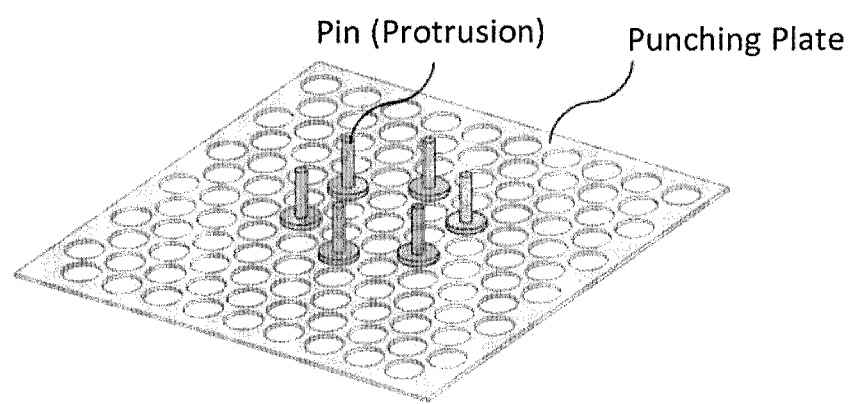
FIG. 4 is a schematic external view of a punching plate and pins.
Figure 5:
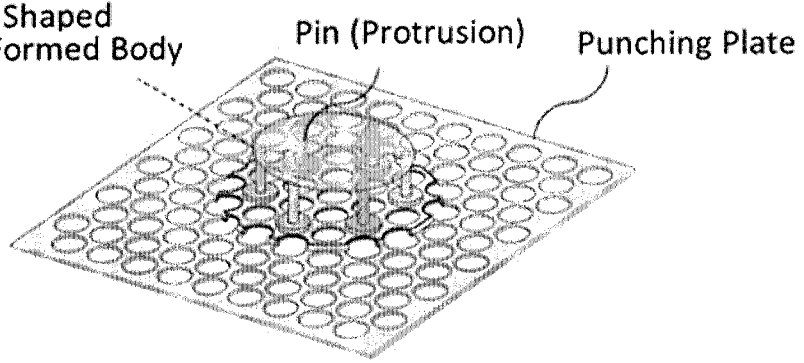
FIG. 5 is a schematic external view and a cross-sectional view of a punching plate and pins.
Figure 5:
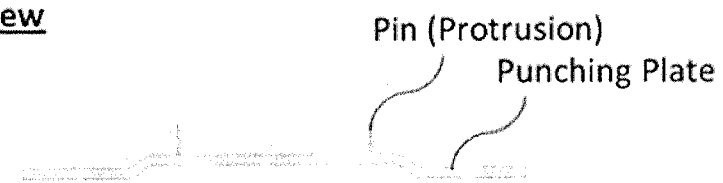

Here, for each of Examples 1 to 3 and 5 to 12, a flat punching plate (pedestal portion) made of aluminum and having a square shape of 180 mm square was mounted on the receiving table, and the circular pillar shaped honeycomb formed body was placed on the punching plate so as to stand thereon. For Example 4, a punching plate (pedestal portion) made of aluminum, having a square shape of 180 mm square and having a convex portion at the center, which had a diameter of 90 mm, was mounted on the receiving table, and the circular pillar shaped honeycomb formed body was placed on the convex portion of the punching plate so as to stand thereon. FIG. 4 shows a schematic external view of the punching plate and pins used in Examples 1 to 3 and 5 to 12. FIG. 5 shows a schematic external view and a sectional view of the punching plate and pins used in Example 4.

A plurality of rod-shaped pins (protrusions) extending in a columnar shape were provided on the punching plates of Examples 1 to 12. The pins were provided under the conditions as shown in Table 1 (the number of pins, pin length, pin diameter, pin arrangement, pin arrangement/honeycomb diameter ratio, pin length/honeycomb length, pin/honeycomb area ratio). Here, the "pin arrangement" in Table 1 refers to "a distance from a center of a punching plate", and "pin arrangement/honeycomb diameter ratio" refers to "a distance of a pin from a center of a punching plate/a diameter of a cross section perpendicular to a honeycomb structure extending direction in a honeycomb structure", and the "pin/honeycomb area ratio" is "an area of a cross section perpendicular to a pin extending direction/an area of a cross section perpendicular to a honeycomb structure extending direction in an unfired honeycomb structure".

The unfired pillar shaped honeycomb formed bodies were conveyed at a conveyance rate of about 600 mm/second for a conveying time of about 1 second while supporting them by inserting the rod-shaped pins thus provided on the punching plate on the receiving table into the bottom surfaces of the unfired pillar shaped honeycomb formed bodies, and dried by dielectric drying to form pillar shaped honeycomb dried bodies. The pillar shaped honeycomb dried bodies were then fired to produce pillar shaped honeycomb structures. Table 1 shows a cell density, a partition wall thickness, a diameter, a length and a mass of the unfired circular pillar shaped honeycomb structure.

Comparative Example 1

Figure 6:
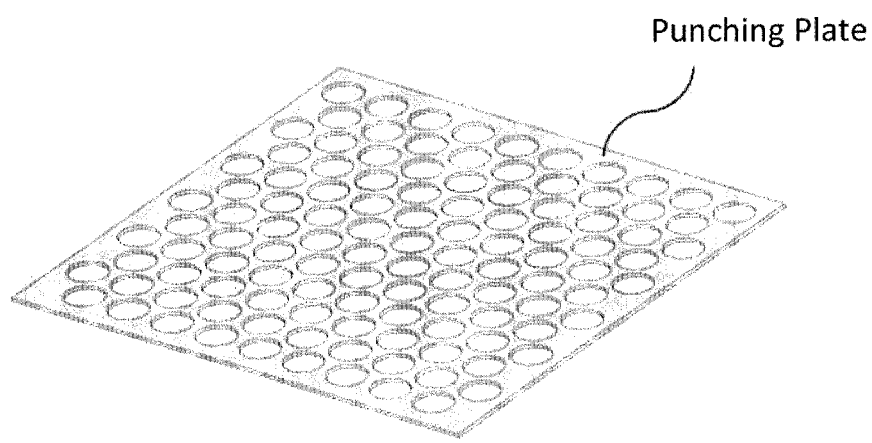
FIG. 6 is a schematic external view of a punching plate.

A honeycomb structure was produced in the same procedure as that of Example 1 with the exception that a flat punching plate having no pin was placed on the receiving table, instead of the punching plate having the pins of Example 1, in the conveying step. The punching plate of Comparative Example 1 had the same structure as that of the punching plate having no pin in Example 1. FIG. 6 shows a schematic external view of the punching plate used in Comparative Example 1.

Comparative Example 2

Figure 7:
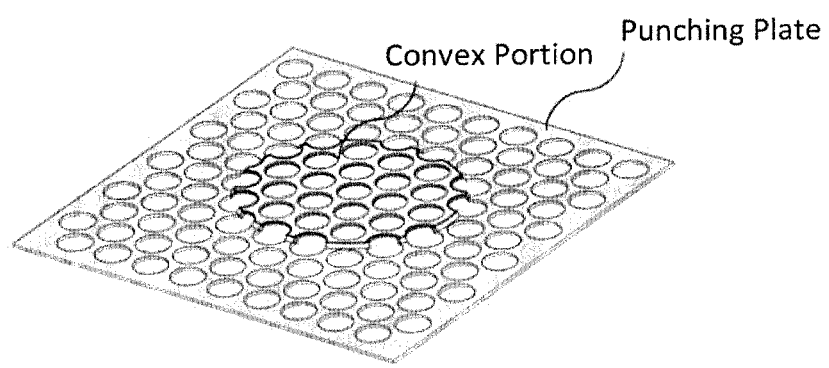
FIG. 7 is a schematic external view and a cross-sectional view of a punching plate.
Figure 7:
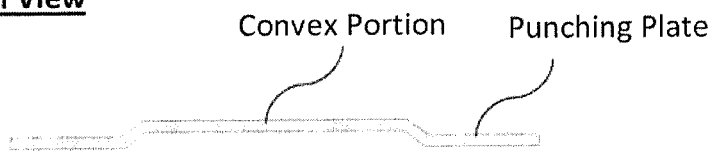

A honeycomb structure was produced in the same procedure as that of Example 1 with the exception that a punching plate having a circular convex portion with a diameter of 90 mm and having no pin was placed on the receiving table, instead of the punching plate of Example 1, in the conveying step. The circular convex portion of the punching plate had the same structure as that of the circular convex portion in Example 4. FIG. 7 shows a schematic external view and a cross-sectional view of the punching plate used in Comparative Example 2.

Evaluation

Top/Bottom Roundness Difference

Evaluation was carried out for roundness (maximum diameter−minimum diameter) of each of top and bottom portions in the cross section perpendicular to the honeycomb structure extending direction, at the top portion (a position of 20 mm from the upper end face) and at the bottom portion (a position of 20 mm from the lower end face) of each dried honeycomb structure. A difference between the roundness of the top portion and the roundness of the bottom portion (Top/Bottom Roundness Difference) was then calculated. A case where the top/bottom roundness difference was 0.4 mm or less was determined to be a good value, and a case where the top/bottom roundness difference was more than 0.4 mm and 0.6 mm or less was determined to be a usable value.

Cell Defect State

By observing the cross section perpendicular to the honeycomb structure extending direction at predetermined distances (20 mm, 30 mm, and 40 mm) in the honeycomb structure extending direction from the lower portion (lower end face) of each dried honeycomb structure, the cell defect state of each honeycomb structure was confirmed. In the observed cross section, a case where a cell was not deformed and crushed was determined to be "Good", and a case where a cell(s) was/were deformed or crushed was determined to be "Bad".

Total Evaluation

A honeycomb structure where the top/bottom roundness difference was 0.4 mm or less and the cell defect state was "Good" at a distance of 20 mm from the end face of the honeycomb structure was determined to be "Good", and a honeycomb structure where the top/bottom roundness difference was more than 0.4 mm and 0.6 mm or less, or the cell defect state was "Bad" at a distance of 20 mm from the end face of the honeycomb structure was determined to be "Acceptable", and a honeycomb structure where the top/bottom roundness difference was more than 0.6 mm was determined to be "Bad".

Test conditions and evaluation results are shown in Table 1. As a result, in each of Examples 1 to 12, the total evaluation was "Good" or "Acceptable". However, in each of Comparative Examples 1 and 2, the total evaluation was "Bad".

TABLE 1

| | Partition | | | | | | | Pin Conditions | | |
| --- | --- | --- | --- | --- | --- | --- | --- | --- | --- | --- |
| | Cell Density Cells/m² | Wall Thickness μm | Honeycomb Diameter mm | Honeycomb Length mm | Mass g | Punching Plate | Pin | Number of Pins quantity | Pin Length mm | Pin Diameter mm |
| Example 1 | 930 | 70 | 120 | 320 | 1200 | Flat | Yes | 6 | 5 | 5 |
| Example 2 | 930 | 70 | 120 | 320 | 1200 | Flat | Yes | 6 | 5 | 5 |
| Example 3 | 930 | 70 | 120 | 320 | 1200 | Flat | Yes | 6 | 5 | 5 |
| Example 4 | 930 | 70 | 120 | 320 | 1200 | φ90 Convex | Yes | 6 | 5 | 5 |
| Example 5 | 930 | 70 | 120 | 320 | 1200 | Flat | Yes | 6 | 5 | 5 |
| Example 6 | 930 | 70 | 120 | 320 | 1200 | Flat | Yes | 6 | 5 | 5 |
| Example 7 | 930 | 70 | 120 | 320 | 1200 | Flat | Yes | 6 | 2.5 | 5 |
| Example 8 | 930 | 70 | 120 | 320 | 1200 | Flat | Yes | 6 | 10 | 5 |
| Example 9 | 930 | 70 | 120 | 320 | 1200 | Flat | Yes | 6 | 20 | 5 |
| Example 10 | 930 | 70 | 120 | 320 | 1200 | Flat | Yes | 6 | 5 | 3 |
| Example 11 | 930 | 70 | 120 | 320 | 1200 | Flat | Yes | 6 | 5 | 11 |
| Example 12 | 930 | 70 | 120 | 320 | 1200 | Flat | Yes | 6 | 5 | 15 |
| Comp. 1 | 930 | 70 | 120 | 320 | 1200 | Flat | No | — | — | — |
| Comp. 2 | 930 | 70 | 120 | 320 | 1200 | φ90 Convex | No | — | — | — |

TABLE 1-continued

| | | Pin Conditions | | | | Cell Defect State Distance from Honeycomb End Face | | | |
|---|---|---|---|---|---|---|---|---|---|
| | Pin Arrangement | Pin Arrangement/ Honeycomb Diameter | Pin Length/ Honeycomb Length | Pin/ Honeycomb Area Ratio | Top/ Bottom Roundness Difference | | | | Total |
| | mm | Ratio | % | % | mm | 20 mm | 30 mm | 40 mm | Evaluation |
| Example 1 | 25 | 0.21 | 1.56 | 0.174 | 0.3 | Good | Good | Good | Good |
| Example 2 | 35 | 0.29 | 1.56 | 0.174 | 0.2 | Good | Good | Good | Good |
| Example 3 | 45 | 0.38 | 1.56 | 0.174 | 0.15 | Good | Good | Good | Good |
| Example 4 | 35 | 0.29 | 1.56 | 0.174 | 0.15 | Good | Good | Good | Good |
| Example 5 | 50 | 0.42 | 1.56 | 0.174 | 0.55 | Good | Good | Good | Acceptable |
| Example 6 | 15 | 0.13 | 1.56 | 0.174 | 0.5 | Good | Good | Good | Acceptable |
| Example 7 | 35 | 0.29 | 0.78 | 0.174 | 0.3 | Good | Good | Good | Good |
| Example 8 | 35 | 0.29 | 3.13 | 0.174 | 0.15 | Bad | Good | Good | Acceptable |
| Example 9 | 35 | 0.29 | 6.25 | 0.174 | 0.15 | Bad | Bad | Good | Acceptable |
| Example 10 | 35 | 0.29 | 1.56 | 0.063 | 0.2 | Good | Good | Good | Good |
| Example 11 | 35 | 0.29 | 1.56 | 0.84 | 0.2 | Good | Good | Good | Good |
| Example 12 | 35 | 0.29 | 1.56 | 1.563 | 0.2 | Bad | Good | Good | Acceptable |
| Comp. 1 | — | — | — | — | 0.7 | Good | Good | Good | Bad |
| Comp. 2 | — | — | — | — | 0.85 | Good | Good | Good | Bad |

What is claimed is:

1. A method for producing at least one honeycomb structure, the method comprising:
    a honeycomb formed body producing step of producing at least one unfired pillar shaped honeycomb body;
    a honeycomb formed body placing step of placing the at least one unfired pillar shaped honeycomb formed body on a receiving table such that that the at least one unfired pillar shaped honeycomb formed body stands thereon;
    a honeycomb formed body conveying step of conveying the at least one unfired pillar shaped honeycomb formed body placed on the receiving table;
    a honeycomb dried body producing step of drying the at least one unfired pillar shaped honeycomb formed body conveyed in the honeycomb formed body conveying step, or drying the at least one unfired pillar shaped honeycomb formed body while conveying it in the honeycomb formed body conveying step to obtain at least one honeycomb dried body; and
    a firing step of firing the at least one honeycomb dried body to obtain at least one honeycomb structure,
    wherein the receiving table comprises at least one protrusion; and
    wherein, in the honeycomb formed body conveying step, the at least one unfired pillar shaped honeycomb formed body is conveyed while supporting it by inserting the at least one protrusion of the receiving table into a bottom surface of the at least one unfired pillar shaped honeycomb formed body placed on the receiving table.

2. The method for producing the at least one honeycomb structure according to claim 1, wherein the protrusions are provided at least in front and backward in a conveying direction on the receiving table.

3. The method for producing the at least one honeycomb structure according to claim 1, wherein the protrusion is inserted into the unfired pillar shaped honeycomb formed body placed on the receiving table, in a range of from a center of a bottom face as a base point to positions each separated by 0.4 L, in which L is a length of the bottom face of the unfired pillar shaped honeycomb formed body in the conveying direction.

4. The method for producing the at least one honeycomb structure according to claim 3, wherein the protrusion is inserted into the unfired pillar shaped honeycomb formed body placed on the receiving table, in a range of from a center of a bottom face as a base point to positions each separated by 0.15 to 0.4 L, in which L is a length of the bottom face of the unfired pillar shaped honeycomb formed body in the conveying direction.

5. The method for producing the at least one honeycomb structure according to claim 1, wherein the protrusion has a height of from 0.5 to 5% of that of the unfired pillar shaped honeycomb formed body when placed on the receiving table.

6. The method for producing the at least one honeycomb structure according to claim 1, wherein the protrusion has a rod shape.

7. The method for producing the at least one honeycomb structure according to claim 1, wherein the protrusion has a cross-sectional area of from 0.04 to 1% of a bottom area of the unfired pillar shaped honeycomb formed body when placed on the receiving table.

8. The method for producing the at least one honeycomb structure according to claim 1, wherein the drying in the honeycomb dried body producing step is dielectric drying.

9. The method for producing the at least one honeycomb structure according to claim 1, wherein the receiving table comprises a pedestal portion on which the protrusion is provided.

10. The method for producing the at least one honeycomb structure according to claim 9, wherein an area of a portion which is on an upper surface of the pedestal portion and is in contact with the bottom surface of the unfired pillar shaped honeycomb formed body is from 40 to 70% of the bottom area of the unfired pillar shaped honeycomb formed body when placed on the receiving table.

11. The method for producing the at least one honeycomb structure according to claim 9, wherein the pedestal portion also serve as an auxiliary electrode for dielectric drying.

\* \* \* \* \*